No. 896,245. PATENTED AUG. 18, 1908.
J. H. REID.
PROCESS OF EXTRACTING METALS FROM ORES.
APPLICATION FILED AUG. 5, 1907.
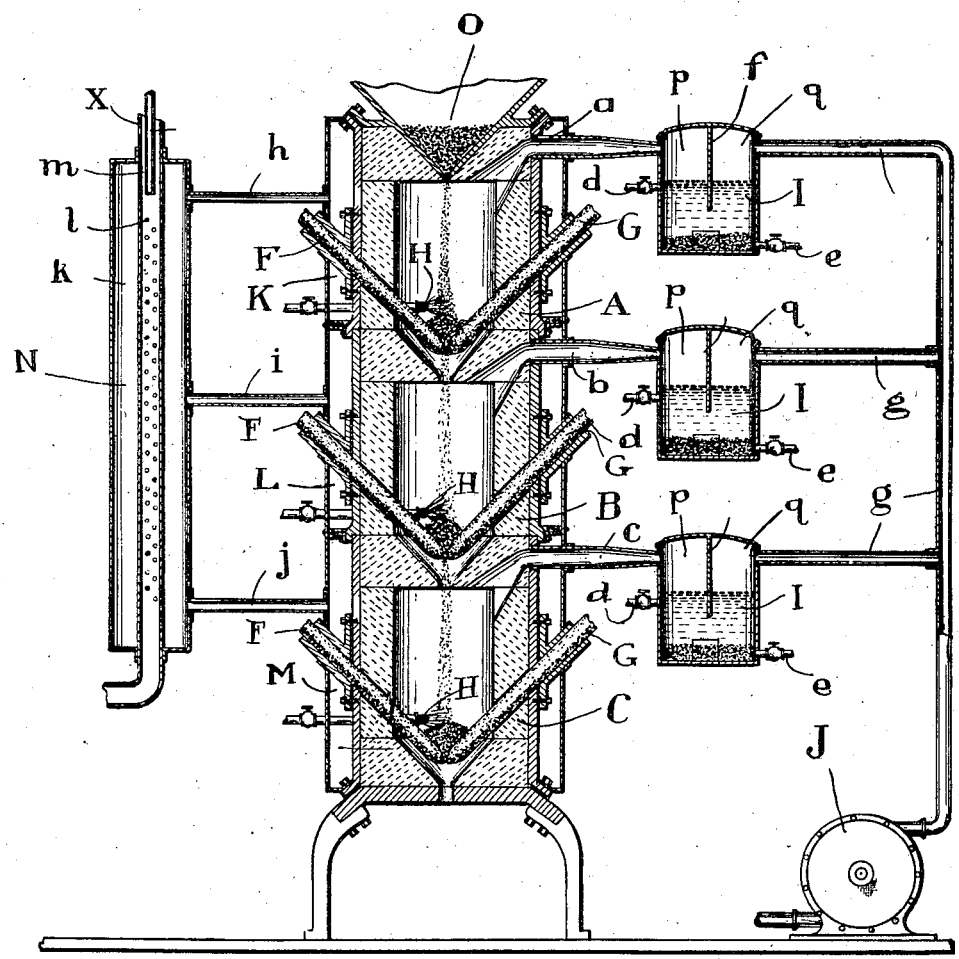
Witnesses
Inventor
J. H. Ried
by
Attorney

UNITED STATES PATENT OFFICE.

JAMES HENRY REID, OF NEWARK, NEW JERSEY, ASSIGNOR TO ELECTRIC SMELTERS, LIMITED, OF OTTAWA, CANADA, A CORPORATION OF CANADA.

PROCESS OF EXTRACTING METALS FROM ORES.

No. 896,245.      Specification of Letters Patent.      Patented Aug. 18, 1908.

Application filed August 5, 1907. Serial No. 387,222.

*To all whom it may concern:*

Be it known that I, JAMES HENRY REID, of Newark, in the State of New Jersey, United States of America, have invented certain new and useful Improvements in Processes of Extracting Metals from Ores, of which the following is a specification.

My invention relates to an improved process of extracting metals from their ores, and the objects of my invention are to provide a simple and efficient process continuously carried out by means of which the metals of the ores may be successively dis-associated and separately recovered in their uncombined free state, from the ore.

In treating complex ores it has been the practice to recover the metals in the form of salts or other compounds which had afterwards to be suitably treated for the recovery of the metals themselves, and these treatments were frequently more costly and difficult to carry out than the original separation.

In my process, I propose to extract the metals in their free uncombined state by causing the sublimation of each metal to occur in a vacuum and where necessary, introducing suitable agents to reduce the existing salts in the ore.

In its specific application the invention is used in combination with and is a further development of the process which I have invented and covered by my United States patent application Serial No. 365,782, filed April 1st, 1907, where there is shown a continuous process of simultaneously extracting the different elements of the ore generally in the form of salts. With the addition of this process herein described, I am enabled to simultaneously obtain the different metals from their ore in their free uncombined state at an exceedingly reduced cost.

An embodiment of an apparatus for carrying out my process is illustrated in the accompanying specifications and drawings.

The drawing shows a vertical sectional view of the apparatus.

A, B and C are the three vacuum treating chambers of the apparatus, discharging into each other and forming together a single unitary structure, the structural details of which are more fully set forth and described in my aforesaid earlier application, Serial No. 365782.

Each of the treating chambers is provided with electrodes F and G, for heating purposes, and nozzles H for the introduction of a reagent such as steam, powdered carbon or the like, as hereinafter more particularly explained. The treating chambers are also each provided with outlet pipes $a$, $b$, and $c$, which lead to condensing tanks I, which are kept partially filled with a suitable condensing liquid, such as water, which is circulated through suitable inlet and outlet pipes $d$ and $e$.

A vacuum is created within each of the chambers and in the embodiment illustrated the means used to effect this also serve to withdraw the volatile metals. These means comprise an exhausting fan J which is operatively connected to each of the tanks by suitable conducting piping $g$, baffle plates $f$ being disposed vertically in each of the tanks and adapted to separate the space above the liquid into two compartments $p$ and $q$, of which the compartment $q$ is exhausted by the fan J and the compartment $p$ receives the volatile metals which are drawn down into the liquid and condensed by the vacuum created in the compartment $q$.

In order to insure the exclusion of air and thus prevent the formation of metallic salts or compounds, such for example, as the formation of sulfur, chlorin or copper oxid as shown in the example hereinafter given, I surround the treating chambers with casings K, L, and M, and exhaust the air from each of the casings through conducting pipes $h$, $i$, and $j$, which communicate with suitable exhausting means, such as the water pump N, which in the specific embodiment illustrated, comprises an outer casing $k$ and an inner perforated tube $l$, through which a column of water falls, supplied by a suitable conductor $m$. It is not necessary that each of these chambers should have a separate casing as if desired a single casing might be provided inclosing the entire apparatus.

In carrying out the process, the ore passes continuously through the apparatus, and while in the vacuum created therein, is subjected by the means herein described, to a different temperature in each chamber, resulting in the sublimation of its different constituents. An ordinary ore will usually contain some of the elements in the form of salts. For instance, iron ore generally contains the iron in the form of an oxid, and to recover the metals in the pure state themselves, it is necessary to reduce the oxid of the compound. This may conveniently be produced by the reduction of the salts by chemical means. This reduction, then, may be readily accomplished by introducing the steam into the ore while under the action of the arc in the first chamber, the intense heat of the arc dissociating the same into hydrogen and oxygen, while the heated carbon of the electrode will combine with the oxygen, leaving the hydrogen free to reduce any oxids or salts in the ore and leaving the metal to be forced off by heat. This will leave the metals in the ore in an uncombined state and they may be successively sublimed by the action of the electric arcs in the different succeeding chambers, through which they pass, the temperature in each chamber being such as to sublime one particular metal.

The operation of the exhaust fan J will serve to exhaust each of the treating chambers and draw the metals sublimed therein into the condensing tanks I, through which water or other condensing medium will be continuously circulated. This will condense the metals which will be recovered in a granular form on the bottom of the tank. It is essential to the operation that the air should be entirely excluded and to insure the accomplishment of this, it is necessary to inclose the chambers with the casing hereinbefore described and exhaust the air therefrom.

As a particular example of the application of the broad process hereinbefore described, I may describe the process as would be carried out to extract the metals from an ore containing sulfur, nickel and copper. To treat this ore the temperature of the first chamber would be such as to sublime the sulfur, (about 1500 C.) This operation would be facilitated by the injection of steam into the ore, which would combine with the sulfur and pass off in the form of sulfurous acid vapor which will condense in the tank I. In the next chamber, the temperature would be raised to about 2000° C., which would be sufficient to sublime the copper, while the vacuum produced would prevent the formation of any oxids or other salts. The sublimed copper will then pass out and being drawn into the condensing liquid in the tank I by the operation of the fan J, and will condense and remain in granular form. During the sublimation, I preferably inject steam to reduce any existing oxids. In the next chamber the temperature may be raised to about 2500° C., which will sublime the nickel, which will be similarly condensed in one of the tanks I.

It is evident that as many treating chambers may be added as are necessary to extract all the different constituents of the ore, the temperature of each chamber being so adjusted that one particular metal will be sublimed therein, and the whole operation being carried out in a vacuum, whereby no salts of the metals or other compounds will be formed.

What I claim as my invention is:—

1. The herein described process of extracting metals from ores which consists in successively subjecting the ore in vacuum to a series of different heating operations and condensing separately and independently the metals sublimed in each.

2. The herein described process of extracting metals from ores, which consists in passing the ore through a series of separate communicating vacuum chambers having different thermal conditions in each and separately and independently condensing the metals sublimed in each chamber, as and for the purpose specified.

3. The herein described process of extracting metals from ores, which consists in subjecting the ore in vacuum to the action of a number of different electric arcs, producing different temperatures, and independently and separately condensing the metals sublimed by each arc, as and for the purpose specified.

4. The herein described process of extracting metals from ores which consists in passing the ore through a series of treating chambers, exhausting both the interior and exterior of the chambers, producing a different temperature in each chamber, and separately condensing the metal freed in each chamber, as and for the purpose specified.

5. The herein described process of extracting metals from ores, which consists in subjecting the ore in a single furnace to a series of immediately consecutive different heating operations, simultaneously carried out, preventing the formation of metallic compounds during each heating operation and introducing a hydrogen carrier into the ore during one of the heating operations.

6. The herein described process of extracting metals from ores, which consists in subjecting the ore in a single furnace to a series of immediately consecutive heating operations simultaneously carried out, creating a vacuum about the ore during the heating operations, and introducing a hydrogen carrier therein at the beginning of the heating operations.

7. The herein described process of extracting metals from ores which consists in subjecting the ores in a single furnace, to a series of immediately consecutive heating operations simultaneously carried out, preventing the formation of metallic compounds during the heating operation and separately exhausting the sublimed metals from each heating operation, through condensing liquids, as and for the purpose specified.

Signed at Ottawa, Province of Ontario, this 20th day of July, 1907.

JAMES HENRY REID.

Witnesses:
RUSSEL S. SMART,
C. W. CAMERON.